(12) United States Patent
Kim

(10) Patent No.: US 10,811,689 B2
(45) Date of Patent: Oct. 20, 2020

(54) EASILY HANDLEABLE ELECTROLYTIC COPPER FOIL, ELECTRODE COMPRISING THE SAME, SECONDARY BATTERY COMPRISING THE SAME, AND METHOD FOR MANUFACTURING THE SAME

(71) Applicant: LS Mtron Ltd., Anyang-si, Gyeonggi-do (KR)

(72) Inventor: Seung Min Kim, Anyang-si (KR)

(73) Assignee: KCF TECHNOLOGIES CO., LTD., Anyang-si, Gyeonggi-Do (KR)

(*) Notice: Subject to any disclaimer, the term of this patent is extended or adjusted under 35 U.S.C. 154(b) by 222 days.

(21) Appl. No.: 15/696,360

(22) Filed: Sep. 6, 2017

(65) Prior Publication Data

US 2018/0102546 A1 Apr. 12, 2018

(30) Foreign Application Priority Data

Oct. 12, 2016 (KR) .......................... 10-2016-0131979

(51) Int. Cl.
*H01M 4/66* (2006.01)
*H01M 4/68* (2006.01)
(Continued)

(52) U.S. Cl.
CPC .............. *H01M 4/661* (2013.01); *C25D 1/04* (2013.01); *C25D 1/20* (2013.01); *C25D 3/38* (2013.01);
(Continued)

(58) Field of Classification Search
None
See application file for complete search history.

(56) References Cited

U.S. PATENT DOCUMENTS

2004/0104117 A1 6/2004 Yang et al.
2008/0050652 A1* 2/2008 Hirose ................ H01M 2/0275
429/200
(Continued)

FOREIGN PATENT DOCUMENTS

CN 104114751 A 10/2014
EP 2660359 A1 11/2013
(Continued)

OTHER PUBLICATIONS

Laser and Optics User's Manual, Chapter 17 Material Expansion Coefficients, pp. 1-12 (Year: 2002).*
(Continued)

*Primary Examiner* — Cynthia H Kelly
*Assistant Examiner* — Julian Anthony
(74) *Attorney, Agent, or Firm* — K&L Gates LLP (57) ABSTRACT

An easily handleable electrolytic copper foil securing a highly durable secondary battery, an electrode including same, a secondary battery including same, and a method of manufacturing same. The electrolytic copper foil including first and second surfaces includes a copper layer including a matte surface facing the first surface and a shiny surface facing the second surface, a first protective layer formed on the matte surface of the copper layer, and a second protective layer formed on the shiny surface of the copper layer. A coefficient of thermal expansion of the electrolyte copper foil measured using thermomechanical analyzer while heating the electrolytic copper foil from 30 to 190° C. at 5° C./min ranges from 16 to 22 μm/(m·° C.), tensile strength of the electrolytic copper foil measured after heat treatment at 190° C., ranges from 21 to 36 kgf/mm², and weight deviation of the electrolytic copper foil is 5% or less.

10 Claims, 1 Drawing Sheet

(51) Int. Cl.
*H01M 4/13* (2010.01)
*H01M 4/58* (2010.01)
*H01M 4/00* (2006.01)
*C25D 1/20* (2006.01)
*C25D 1/04* (2006.01)
*C25D 3/38* (2006.01)
*C25D 7/00* (2006.01)
*H01M 4/04* (2006.01)
*H01M 4/133* (2010.01)
*H01M 4/1395* (2010.01)
*H01M 10/0525* (2010.01)
*H01M 10/052* (2010.01)
*C25D 3/58* (2006.01)

(52) U.S. Cl.
CPC ............ *C25D 7/00* (2013.01); *H01M 4/0452* (2013.01); *H01M 4/0471* (2013.01); *H01M 4/133* (2013.01); *H01M 4/1395* (2013.01); *H01M 4/667* (2013.01); *H01M 10/0525* (2013.01); *C25D 3/58* (2013.01); *H01M 10/052* (2013.01)

(56) References Cited

U.S. PATENT DOCUMENTS

2008/0176144 A1* 7/2008 Iwama ................ H01M 4/134
429/338
2013/0071755 A1* 3/2013 Oguro .................... C23C 30/00
429/245
2013/0256140 A1* 10/2013 Kohiki .................... C25D 1/04
205/50
2016/0260980 A1* 9/2016 Lee ........................ H01M 4/661

FOREIGN PATENT DOCUMENTS

| EP | 2871266 A1 | 5/2015 |
|---|---|---|
| JP | 2000-182623 A | 6/2000 |
| JP | 2001-140091 A | 5/2001 |
| JP | 3943214 B | 4/2007 |
| JP | 2011108442 A | 6/2011 |
| JP | 2012-022939 A | 2/2012 |
| JP | 2013-175488 A | 9/2013 |
| JP | 2013-181236 A | 9/2013 |
| KR | 10-2002-0012118 A | 2/2002 |
| KR | 10-2010-0125044 A | 11/2010 |
| TW | 200946719 A | 11/2009 |
| WO | 2009116432 A1 | 9/2009 |

OTHER PUBLICATIONS

Japanese Office Action for related Japanese Application No. 2017-162283; action dated Oct. 23, 2018; (2 pages).
Unknown; "The Chemical Dictionary"; Oct. 20, 1989; p. 1233; (4 pages).
European Search Report for related European Application No. 17189147.6; report dated Feb. 23, 2018; (8 pages).
Taiwanese Office Action for related Taiwanese Application No. 106134727; action dated Nov. 14, 2018; (5 pages).

* cited by examiner

EASILY HANDLEABLE ELECTROLYTIC COPPER FOIL, ELECTRODE COMPRISING THE SAME, SECONDARY BATTERY COMPRISING THE SAME, AND METHOD FOR MANUFACTURING THE SAME

CROSS-REFERENCE TO RELATED APPLICATION

This application claims priority to and the benefit of Korean Patent Application No. 10-2016-0131979, filed on Oct. 12, 2016, the disclosure of which is incorporated herein by reference in its entirety.

BACKGROUND

1. Field of the Invention

The present invention relates to an easily handleable electrolytic copper foil, an electrode including the same, a secondary battery including the same, and a method of manufacturing the same.

2. Discussion of Related Art

A secondary battery is a type of energy conversion device that converts electrical energy into chemical energy, stores the chemical energy, and generates electricity by converting the chemical energy into electrical energy when the electricity is needed, and is referred to as a "rechargeable battery."

Lead-acid batteries, nickel cadmium secondary batteries, nickel hydrogen secondary batteries, lithium secondary batteries, and the like are secondary batteries which are economically and environmentally advantageous compared to disposable primary batteries.

Lithium secondary batteries may store a relatively large amount of energy relative to a size and weight thereof in comparison to other secondary batteries. Therefore, in the field of information communication devices in which portability and mobility are important, the lithium secondary batteries are preferred and an application range thereof is also expanding to energy storage devices for hybrid vehicles and electric vehicles.

Lithium secondary batteries are used by repeatedly performing a cycle including charging and discharging. When operating a certain device with a fully charged lithium secondary battery, the lithium secondary battery should have a high charge and discharge capacity to increase an operating time of the device. Therefore, research to satisfy the ever-increasing expectations (needs) of consumers for charge and discharge capacity of a lithium secondary battery is continuously required.

As a method for increasing capacity of the lithium secondary battery, a method in which a composite active material, in which Si or Sn is added to a carbon active material, is used as an active material to be applied to an electrolytic copper foil when an anode of a secondary battery is manufactured has been proposed. However, such a composite active material rapidly and significantly expands due to heat generated when the lithium secondary battery is charged or discharged, causing breakage of the electrolytic copper foil. Also, an electrolytic copper foil having a thickness of 10 µm or less, which is generally used for manufacturing an anode of a lithium secondary battery, is particularly vulnerable to curling or wrinkling, and the curling or wrinkling of the electrolytic copper foil not only makes handling of the electrolytic copper foil difficult but also makes it impossible to coat the electrolytic copper foil with an active material.

SUMMARY OF THE INVENTION

The present invention is directed to an electrolytic copper foil capable of preventing problems caused by limitations and disadvantages of the related art, an electrode including the same, a secondary battery including the same, and a method of manufacturing the same.

The present invention is directed to an electrolytic copper foil having improved handleability and capable of securing a secondary battery having a high durability.

The present invention is directed to an electrode capable of securing a secondary battery having a high durability.

The present invention is directed to a secondary battery having a high durability.

The present invention is directed to a method of manufacturing an electrolytic copper foil having improved handleability and capable of securing a secondary battery having a high durability.

In addition to the above-described aspects of the present invention, other features and advantages of the present invention will be described below or will become apparent to those skilled in the art from the following description.

According to an aspect of the present invention, there is provided an electrolytic copper foil having a first surface and a second surface opposite the first surface, the electrolytic copper foil including a copper layer having a matte surface facing the first surface and a shiny surface facing the second surface, a first protective layer on the matte surface of the copper layer and a second protective layer on the shiny surface of the copper layer, wherein a coefficient of thermal expansion of the electrolytic foil, which is measured using a thermomechanical analyzer (TMA) while heating the electrolytic copper foil from 30° C. to 190° C. at a speed of 5° C./min, ranges from 16 to 22 $\mu m/(m \cdot °C.)$, a tensile strength of the electrolytic copper foil, which is measured after a heat treatment at a temperature of 190° C. for 1 hour, ranges from 21 to 36 $kgf/mm^2$, and a weight deviation of the electrolytic copper foil is 5% or less.

The electrolytic copper foil has an elongation of 3% or more at room temperature.

A peak count (Pc) of each of the first and second surfaces of the electrolytic copper foil ranges from 3 to 92.

Each of the first and second protective layers includes at least one of chromium (Cr), a silane compound, and a nitrogen compound.

The electrolytic copper foil has a thickness of 4 to 30 µm.

Each of the first and second surfaces has a surface roughness ($R_z$) of 3.5 µm or less.

The electrolytic copper foil has a coefficient of thermal expansion of 17.3 to 22 $\mu m/(m \cdot °C.)$.

According to another aspect of the present invention, there is provided a secondary battery electrode including an electrolytic copper foil including a first surface and a second surface opposite the first surface and a first active material layer on the first surface of the electrolytic copper foil, wherein the electrolytic copper foil includes a copper layer including a matte surface facing the first surface and a shiny surface facing the second surface, a first protective layer on the matte surface of the copper layer and a second protective layer on the shiny surface of the copper layer, and wherein a coefficient of thermal expansion of the electrolytic foil, which is measured using a TMA while heating the electrolytic copper foil from 30° C. to 190° C. at a speed of 5°

C./min, ranges from 16 to 22 μm/(m·° C.), a tensile strength of the electrolytic copper foil, which is measured after a heat treatment at a temperature of 190° C. for 1 hour, ranges from 21 to 36 kgf/mm$^2$, and a weight deviation of the electrolytic copper foil is 5% or less.

The first active material layer includes at least one active material selected from a group consisting of carbon, a metal (Me) such as Si, Ge, Sn, Li, Zn, Mg, Cd, Ce, Ni, or Fe, an alloy containing the metal (Me), an oxide of the metal (MeO$_x$), and a composite of the metal (Me) and carbon.

The first active material layer includes Si.

The secondary battery electrode further includes a second active material layer on the second protective layer.

According to still another aspect of the present invention, there is provided a secondary battery including a cathode, an anode including the secondary battery electrode, an electrolyte configured to provide an environment in which lithium ions may move between the cathode and the anode and a separator configured to electrically insulate the cathode from the anode.

According to yet another aspect of the present invention, there is provided a method of manufacturing a secondary battery electrolytic copper foil, the method including preparing an electrolytic solution containing 70 to 90 g/L of copper ions and 80 to 130 g/L of sulfuric acid, forming a copper layer by performing electroplating which applies electricity between a positive electrode plate and a rotating negative electrode drum which are disposed to in the electrolytic solution be spaced apart from each other and forming a protective layer on the copper layer, wherein, while the electroplating is performed, an interval between the positive electrode plate and the rotating negative electrode drum is maintained to be in a range of 5 to 15 mm, a difference between a maximum interval and a minimum interval of the positive electrode plate and the rotating negative electrode drum in a width direction of the copper layer is maintained to be less than 0.2 mm, total organic carbon (TOC) in the electrolytic solution is maintained at 50 ppm or less, and a concentration of silver (Ag) in the electrolytic solution is maintained at 25 ppm or less.

The electroplating is performed by applying a current density of 30 to 80 A/dm$^2$ between the positive electrode plate and the rotating negative electrode drum.

The preparing of the electrolytic solution includes performing a heat treatment on a copper wire, pickling the heat-treated copper wire and introducing the pickled copper wire into sulfuric acid.

The copper wire is heat-treated at a temperature of 600 to 900° C. for 2 to 6 hours and the heat-treated copper wire is pickled by being immersed in an acidic solution containing 8 to 10 wt % of sulfuric acid and 1 to 2 wt % of hydrogen peroxide and then being washed with water.

While the electroplating is performed, continuous filtration for removing solid impurities from the electrolytic solution is performed at a flow rate of 31 to 45 m$^3$/hr.

The electrolytic solution further contains chloride ions capable of precipitating silver (Ag) in the form of AgCl to prevent the concentration of silver (Ag) from exceeding 25 ppm by silver (Ag) being introduced into the electrolytic solution while the electroplating is performed.

The electrolytic solution further contains an organic additive selected from a group consisting of hydroxyethyl cellulose (HEC), organic sulfides, organic nitrides, and thiourea-based compounds.

The forming of the protective layer includes immersing the copper layer in an antirust solution containing 0.5 to 1.5 g/L of chromium (Cr).

The general description of the present invention as described above is merely intended to illustrate or explain the present invention and does not limit the scope of the present invention.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings.

It should be apparent to those skilled in the art that various modifications and alterations can be made in the present invention without departing from the spirit and scope of the invention. Therefore, the present invention includes all modifications and alterations that come within the scope of the invention as defined in the appended claims and equivalents thereof.

A lithium secondary battery includes a cathode, an anode, an electrolyte, which provides an environment in which lithium ions may move between the cathode and the anode, and a separator, which electrically insulates the cathode from the anode to prevent electrons generated at one electrode from being inefficiently consumed by moving the electrons to the other electrode through an inside of the secondary battery.

Figure 1:
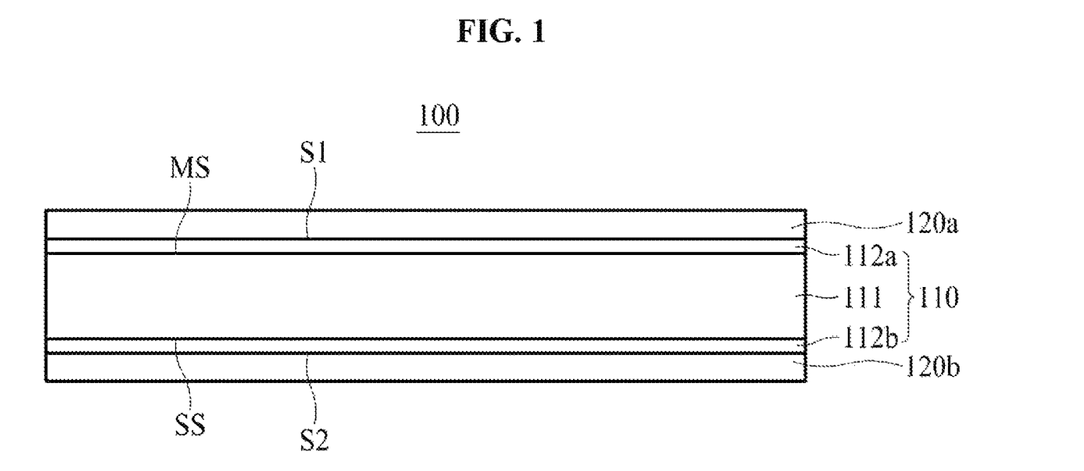
FIG. 1 is a cross-sectional view of a secondary battery electrode according to an embodiment of the present invention.

FIG. 1 is a cross-sectional view of a secondary battery electrode according to an embodiment of the present invention.

As illustrated in FIG. 1, a secondary battery electrode 100 according to an embodiment of the present invention includes an electrolytic copper foil 110 having a first surface S1 and a second surface S2 opposite the first surface S, a first active material layer 120a on the first surface S1, and a second active material layer 120b on the second surface S2. In FIG. 1, an example in which the active material layers 120a and 120b are illustrated as being formed on both the first and second surfaces S1 and S2 of the electrolytic copper foil 110, respectively, but the present invention is not limited thereto, and the secondary battery electrode 100 of the present invention may include only one of the first and second active material layers 120a and 120b as an active material layer.

Generally, in a lithium secondary battery, an aluminum foil is used as a positive electrode current collector coupled to a positive electrode active material, and an electrolytic copper foil is used as a negative electrode current collector coupled to a negative electrode active material.

According to an embodiment of the present invention, the secondary battery electrode 100 is used as an anode of a lithium secondary battery, the electrolytic copper foil 110 functions as a negative electrode current collector, and each of the first and second active material layers 120a and 120b includes a negative electrode active material.

As illustrated in FIG. 1, the electrolytic copper foil 110 of the present invention, which functions as a negative electrode current collector of a secondary battery, includes a copper layer 111 having a matte surface MS and a shiny surface SS, a first protective layer 112a on the matte surface MS of the copper layer 111, and a second protective layer 112b on the shiny surface SS of the copper layer 111.

The matte surface MS is a surface of the copper layer 111 facing the first surface S1 of the electrolytic copper foil 110, and the shiny surface SS is a surface of the copper layer 111 facing the second surface S2 of the electrolytic copper foil 110.

The copper layer 111 of the present invention may be formed on a rotating negative electrode drum by electroplating being performed. The shiny surface SS thereof refers to a surface that comes into contact with the rotating negative electrode drum in an electroplating process, and the matte surface MS refers to a surface opposite the shiny surface SS.

Generally, the shiny surface SS has a lower surface roughness (Rz) than the matte surface MS, but the present invention is not limited thereto, and the surface roughness (Rz) of the shiny surface SS may be higher than or equal to that of the matte surface MS.

The first and second protective layers 112a and 112b may include at least one of chromium (Cr), a silane compound, and a nitrogen compound and may be formed to prevent corrosion of the copper layer 111, improve heat resistance of the copper layer 111, and suppress the reduction of a charge and discharge efficiency of the secondary battery by increasing an adhesion strength between the copper layer 111 and the active material layers 120a and 120b.

According to the present invention, a coefficient of thermal expansion of the electrolytic copper foil 110, which is measured by using a thermomechanical analyzer (TMA) while heating the electrolytic copper coil 110 from 30° C. to 190° C. at a speed of 5° C./min, ranges from 16 to 22 $\mu m/(m \cdot °C.)$.

When the coefficient of thermal expansion is less than 16 $\mu m/(m \cdot °C.)$, the electrolytic copper foil 110 may be broken when the active material rapidly and significantly expands due to heat generated during charging and discharging of the lithium secondary battery. On the other hand, when the coefficient of thermal expansion is more than 22 $\mu m/(m \cdot °C.)$, curling and/or wrinkling of the electrolytic copper foil 110 is caused by heat received during the manufacturing process of the lithium secondary battery, which not only makes handling of the electrolytic copper foil difficult but also makes it impossible to coat the electrolytic copper foil 110 with the active material when manufacturing the secondary battery electrode 100.

Specifically, a volume of the active material expands when the lithium secondary battery is charged or discharged. When the electrolytic copper foil 110 also expands corresponding to the expansion of the volume of the active material, breakage of the electrolytic copper foil 110 may be prevented. Therefore, in order to prevent breakage of the electrolytic copper foil 110 due to the expansion of the volume of the active material, the electrolytic copper foil 110 may have a coefficient of thermal expansion of 16 $\mu m/(m \cdot °C.)$ or more, and more specifically, may have a coefficient of thermal expansion of 17.3 $\mu m/(m \cdot °C.)$ or more. That is, the electrolytic copper foil 110 may have, for example, a coefficient of thermal expansion of 17.3 to 22 $\mu m/(m \cdot °C.)$.

According to the present invention, a tensile strength of the electrolytic copper foil 110 measured after being heat treated at a temperature of 190° C. for 1 hour ranges from 21 to 36 $kgf/mm^2$.

When the tensile strength of the electrolytic copper foil 110 is less than 21 $kgf/mm^2$, there is a high risk of wrinkling due to the ease of deformation of the electrolytic copper foil 110 caused by a tension applied to the electrolytic copper foil 110 during a roll-to-roll process for manufacturing the secondary battery electrode 100 and the secondary battery. On the other hand, when the tensile strength of the electrolytic copper foil 110 is more than 36 $kgf/mm^2$, there is a high risk that the electrolytic copper foil 110 is broken when the lithium secondary battery is charged and discharged.

The electrolytic copper foil 110 of the present invention has a weight deviation of 5% or less. In this specification, the "weight deviation" may be obtained by taking 5 cm×5 cm samples at three points arranged in a width direction, that is, a transverse direction (TD) of the electrolytic copper foil 110, measuring a weight of each of the samples to calculate a weight per unit area, and then calculating an average weight and a standard deviation of the weights from the weights per unit area of the three samples. That is, the weight deviation is calculated by calculating the "average weight" and the "standard deviation of the weights" from the weights per unit area of the three samples and calculating a ratio (%) of the standard deviation of the weights to the average weight [(standard deviation of weights/average weight)× 100].

When the weight deviation of the electrolytic copper foil 110 is more than 5%, there is a high risk of wrinkling due to the ease of deformation of the electrolytic copper foil 110 caused by the tension applied to the electrolytic copper foil 110 during the roll-to-roll process for manufacturing the secondary battery.

The secondary battery electrolytic copper foil 110 of the present invention may have an elongation of 3% or more at room temperature (25±15° C.), and preferably, may have an elongation of 3 to 10%. When the elongation of the electrolytic copper foil 110 is less than 3%, a risk that the electrolytic copper foil 110 may not be stretched and may be torn due to a force applied in the process of manufacturing the secondary battery electrode 100 and the secondary battery is increased, and a risk of breakage of the electrolytic copper foil 110 during charging and discharging of the lithium secondary battery is increased. On the other hand, when the elongation of the electrolytic copper foil 110 is more than 10%, there is a high risk of wrinkling due to the ease of deformation of the electrolytic copper foil 110 caused by the tension applied to the electrolytic copper foil 110 during the roll-to-roll process for manufacturing the secondary battery.

The electrolytic copper foil 110 of the present invention may have a thickness of 4 to 30 μm. When the thickness of the electrolytic copper foil 110 is less than 4 μm, wrinkles are easily caused and workability of the process of manufacturing the secondary battery is lowered. On the other hand, when the thickness of the electrolytic copper foil 110 is more than 30 μm, it is difficult to implement a high-capacity lithium secondary battery.

Each of the first and second active material layers 120a and 120b includes at least one active material selected from the group consisting of carbon, a metal such as Si, Ge, Sn, Li, Zn, Mg, Cd, Ce, Ni, or Fe, an alloy containing the metal, an oxide of the metal, and a composite of the metal and carbon as a negative electrode active material.

In order to increase charge and discharge capacity of the secondary battery, the active material layers 120a and 120b may be a mixture containing a predetermined amount of Si.

Meanwhile, as charging and discharging of the secondary battery is repeated, contraction and expansion of the active material layers 120a and 120b occur alternately. This causes separation of the active material layers 120a and 120b from the electrolytic copper foil 110, thereby reducing a charge and discharge efficiency of the secondary battery. Therefore, in order for the secondary battery to have a capacity retention rate and a lifetime of a certain level or more (i.e., in order to suppress deterioration of the charge and discharge efficiency of the secondary battery), the electrolytic copper foil 110 should have an excellent coating property with respect to the active material. That is, adhesion strength between the electrolytic copper foil 110 and the active material layers 120a and 120b should be high.

Generally, it is known that the adhesion strength between the electrolytic copper foil 110 and the active material layers 120a and 120b may be improved by controlling the surface roughness (Rz) of the electrolytic copper foil 110. However, actually, the electrolytic copper foil 110 whose surface roughness (Rz) is appropriately adjusted does not necessarily satisfy an adhesion force between the electrolytic copper foil 110 and the active material layers 120a and 120b required in a specification. Specifically, it is known that, when the active material layers 120a and 120b include Si to increase the capacity of the secondary battery, a relationship between the surface roughness (Rz) of the electrolytic copper foil 110 and the capacity retention rate of the secondary battery is low.

According to the present invention, it is known that, when securing the sufficient adhesive force between the electrolytic copper foil 110 and the active material layers 120a and 120b, a peak count (Pc) of the surface, along with the surface roughness (Rz) of the surface of the electrolytic copper foil 110, is an important factor.

The peak count (Pc), along with the surface roughness ($R_z$), affects a physical bonding force between the electrolytic copper foil 110 and the first active material layer 120a. Hereinafter, the peak count (Pc) will be described with reference to FIG. 2.

Figure 2:
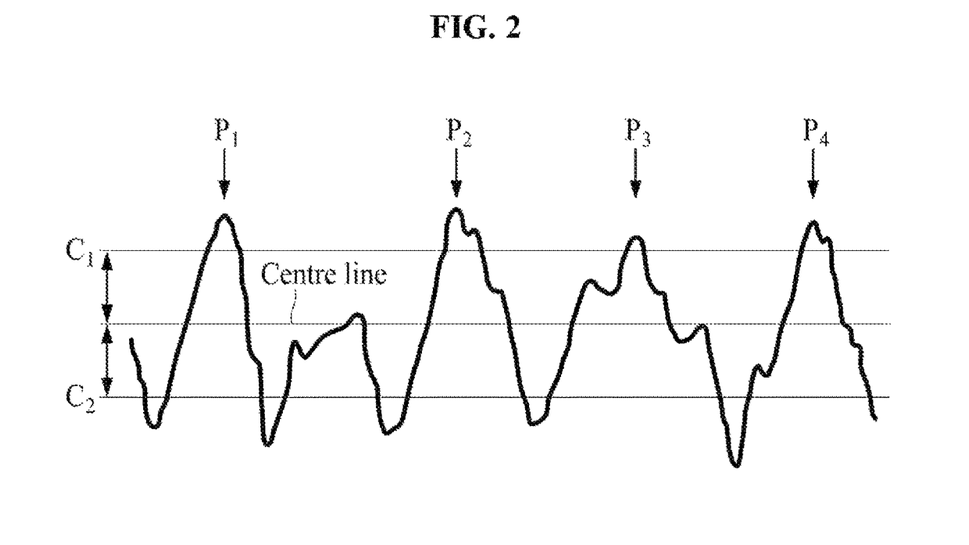
FIG. 2 illustrates a surface roughness profile obtained according to U.S. standard ASME B46.1-2009.

In the present invention, the "peak count (Pc)" may be obtained by measuring peak counts (Pc) of any three points on the surface of the electrolytic copper foil 110 and calculating an average value of measured values of the peak counts (Pc). The peak count (Pc) of each of the points is the number of effective peaks P1, P2, P3, and P4 which rise above a 0.5 µm upper criteria line C1 per 4 mm unit sample length in a surface roughness profile obtained according to U.S. standard ASME B46.1-2009. In this case, at least one valley deeper than a −0.5 µm lower criteria line C2 exists between adjacent effective peaks among the effective peaks. When there is no valley deeper than the −0.5 µm lower criteria line C2 between adjacent peaks which rise above the upper criteria line C1, all of the adjacent peaks may not be "effective peaks" used for measuring the peak count (Pc), and relatively lower peaks among the peaks are ignored when obtaining the number of "effective peaks."

According to an embodiment of the present invention, a peak count (Pc) of each of the first and second surfaces S1 and S2 of the electrolytic copper foil 110 ranges from 3 to 92, and a surface roughness (Rz) of each of the first and second surfaces S1 and S2 is 3.5 µm or less.

When the peak count (Pc) is less than 3, an active specific surface area of the electrolytic copper foil 110 which may come in contact with the negative electrode active material is too small to ensure sufficient adhesion between the electrolytic copper foil 110 and the active material layers 120a and 120b.

On the other hand, when, the peak count (Pc) is more than 92 or the surface roughness (Rz) is more than 3.5 µm, coating uniformity of the negative electrode active material is lowered due to too many surface irregularities, and thus the adhesion between the electrolytic copper foil 110 and the active material layers 120a and 120b is significantly lowered.

Hereinafter, a method of manufacturing an electrolytic copper foil 110 according to an embodiment of the present invention will be described in detail.

First, an electrolytic solution containing 70 to 100 g/L of copper ions and 80 to 130 g/L of sulfuric acid is prepared, and the copper layer 111 is formed by applying electricity between a positive electrode plate and a rotating negative electrode drum, which are disposed in the electrolytic solution, to perform an electroplating.

According to the present invention, while the electroplating is performed, the electrolytic solution is maintained such that total organic carbon (TOC) in the electrolytic solution is maintained at 50 ppm or less. As organic matter content in the electrolytic solution is increased, possibility of the organic matter being present in crystal grains of the copper layer 111 produced through the electroplating is increased. Organic matter in the crystal grains of the copper layer 111 causes the coefficient of thermal expansion of the electrolytic copper foil 110 to be lower than 16 µm/(m·° C.).

In order to maintain total organic carbon (TOC) in the electrolytic solution at 50 ppm or less, a high-purity copper wire is heat-treated to burn organic matter thereon, the heat-treated copper wire is pickled, and an electrolytic solution having little or no impurities may be prepared by introducing the pickled copper wire into sulfuric acid.

The copper wire may be heat-treated at a temperature of 600 to 900° C. for 2 to 6 hours in an oxygen atmosphere in an electric furnace, and the heat-treated copper wire may be pickled by being immersed in an acidic solution containing 8 to 10 wt % of sulfuric acid and 1 to 2 wt % of hydrogen peroxide and then being washed with water. Thus, organic impurities, which may be attached to a surface of the copper wire, are completely removed, thereby preventing the organic impurities from being introduced into the electrolytic solution.

According to the present invention, a concentration of silver (Ag) in the electrolytic solution is maintained at 25 ppm or less while the electroplating is performed. When the concentration of silver (Ag) in the electrolytic solution is more than 25 ppm, the silver (Ag) is electrodeposited on the copper layer 111 when the copper layer 111 is formed, and a final coefficient of thermal expansion of the electrolytic copper foil 110 exceeds 22 µm/(m·° C.).

In order to prevent the concentration of silver (Ag) from exceeding 25 ppm by silver (Ag) being introduced into the electrolytic solution when the electroplating is performed, a copper wire not containing silver (Ag) may be used, or the electrolytic solution may include a small amount (e.g., 50 ppm or less) of chloride ions capable of precipitating silver (Ag) in the form of AgCl.

The peak count (Pc) and the surface roughness (Rz) of each of the first and second surfaces S1 and S2 of the electrolytic copper foil 110 may be respectively controlled to be 3 to 92 and 3.5 µm or less by managing each of TOC and the concentration of silver (Ag) within the above ranges.

Meanwhile, the method of the present invention may further include performing continuous (or circulating) filtration at a flow rate of 31 to 45 m³/hr to remove solid impurities from the electrolytic solution while the electroplating is performed. When the flow rate is less than 31 m³/hr, a flow velocity is lowered, overvoltage is increased, and the copper layer 111 is not uniformly formed. On the other hand, when the flow rate is more than 45 m³/hr, a filter is damaged and foreign matter is introduced into the electrolytic solution.

Optionally, the TOC may be lowered by decomposing organic matter in the electrolytic solution through an ozone treatment.

Optionally, cleanliness of the electrolytic solution may be improved by introducing hydrogen peroxide and air into the electrolytic solution while the electroplating is performed.

Optionally, the electrolytic solution may further include an organic additive selected from the group consisting of hydroxyethyl cellulose (HEC), organic sulfides, organic nitrides, and thiourea-based compounds.

According to an embodiment of the present invention, the electroplating may be performed by applying a current density of 30 to 80 A/dm² between the positive electrode plate and the rotating negative electrode drum.

According to the present invention, in order for the electrolytic copper foil 110 to have a weight deviation of 5% or less, while the electroplating is performed, an interval between the positive electrode plate and the rotating negative electrode drum is maintained to be in a range of 5 to 15 mm, and a difference between a maximum interval and a minimum interval of the positive electrode plate and the rotating negative electrode drum according to a width direction of the copper layer 111 is maintained to be less than 0.2 mm.

Next, the first and second protective layers 112a and 112b are formed on the copper layer 111 by immersing the copper layer 111 manufactured as described above in an antirust solution containing 0.5 to 1.5 g/L of Cr (e.g., at room temperature for 2 to 20 seconds) and drying the copper layer 111.

When a concentration of chromium (Cr) in the antirust solution is less than 0.5 g/L, the amount of chromium electrodeposition ($DA_{Cr}$) of the surface of the electrolytic copper foil 110 is less than 0.5 mg/m², oxidation of the surface of the electrolytic copper foil 110 is caused, and the chemical bonding force between the electrolytic copper foil 110 and the active material layers 120a and 120b is lowered.

On the other hand, when the concentration of chromium (Cr) in the antirust solution is more than 1.5 g/L, the amount of chromium electrodeposition ($DA_{Cr}$) of the surface of the electrolytic copper foil 110 exceeds 3.8 mg/m², the hydrophobic property of the surface of the electrolytic copper foil 110 is significantly increased, and the chemical affinity with the negative electrode active material is lowered, which eventually results in a reduction of the adhesion between the electrolytic copper foil 110 and the active material layers 120a and 120b.

The antirust solution may further include at least one of a silane compound and a nitrogen compound. For example, the antirust solution may include 0.5 to 1.5 g/L of Cr and 0.5 to 1.5 g/L of a silane compound.

Meanwhile, when a concentration of copper (Cu) in the antirust solution is too high, the amount of chromium (Cr) electrodeposited on the surface of the copper layer 111 is reduced. Therefore, according to an embodiment of the present invention, the concentration of copper (Cu) in the antirust solution is maintained at 0.1 g/L or less. When the concentration of copper (Cu) is more than 0.1 g/L, the amount of chromium electrodeposition ($DA_{Cr}$) of the surface of the electrolytic copper foil 110 is less than 0.5 mg/m², oxidation of the surface of the electrolytic copper foil 110 is caused, and the chemical bonding force between the electrolytic copper foil 110 and the active material layers 120a and 120b is lowered.

Meanwhile, the peak count (Pc) and the surface roughness (Rz) of the second surface S2 of the electrolytic copper foil 110 may be controlled to be 3 to 110 and 0.5 to 2.7 μm, respectively, by adjusting a degree of polishing of a surface (e.g., a surface on which copper is precipitated by performing electroplating) of the rotating negative electrode drum.

According to an embodiment of the present invention, the surface of the rotating negative electrode drum is polished with an abrasive brush having a particle-size (Grit) of #800 to #1500.

The secondary battery electrode (i.e., an anode) of the present invention may be manufactured by coating the electrolytic copper foil 110 of the present invention manufactured as described above with the negative electrode active material.

The negative electrode active material may be selected from the group consisting of carbon, a metal (Me) such as Si, Ge, Sn, Li, Zn, Mg, Cd, Ce, Ni, or Fe, an alloy containing the metal (Me), an oxide of the metal ($MeO_x$), and a complex of the metal (Me) and carbon.

For example, 1 to 3 parts by weight of styrene butadiene rubber (SBR) and 1 to 3 parts by weight of carboxymethyl cellulose (CMC) are mixed in 100 parts by weight of carbon for the negative electrode active material, and a slurry is then prepared using distilled water as a solvent. Next, the electrolytic copper foil 110 is coated with the slurry to have a thickness of 20 to 100 μm using a doctor blade and is pressed at a temperature of 110 to 130° C. under a pressure of 0.5 to 1.5 ton/cm².

The lithium secondary battery may be manufactured using a conventional cathode, an electrolyte, and a separator together with the secondary battery electrode (or the anode) of the present invention manufactured as described above.

Hereinafter, the present invention will be described in detail with reference to examples and comparative examples. However, the following examples are only examples to help understanding of the present invention, and the scope of the present invention is not limited to these examples.

Examples 1 to 4 and Comparative Examples 1 to 6

A copper layer was formed by applying electricity between a positive electrode plate and a rotating negative electrode drum at a current density of 65 ASD while maintaining an electrolyte solution containing 75 g/L of copper and 105 g/L of sulfuric acid at a temperature of 65° C. Here, a TOC in the electrolyte solution, a concentration of silver (Ag), and a difference between a maximum interval and a minimum interval of the positive electrode plate and the rotating negative electrode drum are illustrated in the following Table 1.

Then, the copper layer was immersed in an antirust solution and dried to prepare an electrolytic copper foil.

TABLE 1

| | TOC in Electrolyte Solution (ppm) | Concentration of Ag Electrolyte Solution (ppm) | Difference between Maximum Interval and Minimum Interval of Positive Electrode Plate and Rotating Negative Electrode Drum (mm) |
|---|---|---|---|
| Example 1 | 45 | 22 | 0.18 |
| Example 2 | 2 | 3 | 0.18 |
| Example 3 | 2 | 22 | 0.07 |
| Example 4 | 47 | 3 | 0.07 |
| Comparative Example 1 | 3 | 32 | 0.18 |
| Comparative Example 2 | 52 | 15 | 0.18 |
| Comparative Example 3 | 15 | 45 | 0.07 |
| Comparative Example 4 | 62 | 3 | 0.07 |
| Comparative Example 5 | 2 | 3 | 0.22 |
| Comparative Example 6 | 45 | 22 | 0.32 |

A coefficient of thermal expansion, a tensile strength after heat treatment, a weight deviation, an elongation, the presence or absence of a wrinkle, and breakage after 500 cycles of charging and discharging of each of the electrolytic copper foils in Examples 1 to 4 and Comparative Example 1 to 6 prepared in the above were measured or calculated as follows, and results thereof are illustrated in the following Table 2.

Coefficient of Thermal Expansion [μm/(m·°C.)]

The coefficient of thermal expansion defined by the following Equation 1 was measured using a TMA (Thermomechanical Analyzer) while samples of the electrolytic copper foils were heated from 30° C. to 190° C. at a speed of 5° C./min.

$$CTE = \Delta L / [L_O \times \Delta T] \qquad \text{Equation 1:}$$

Here, CTE denotes a coefficient of thermal expansion, $L_O$ denotes an initial length (m) of a sample, ΔL denotes a change (μm) of the length of the sample, and ΔT denotes a temperature change (° C.).

Tensile Strength after Heat Treatment (Kgf/Mm²)

A sample of the electrolytic copper foil was heat-treated at a temperature of 190° C. for 1 hour and a tensile strength of the heat-treated sample was then measured using a universal testing machine (UTM). In this case, a width of the sample was 12.7 mm, a distance between grips was 50 mm, and a measurement speed was 50 mm/min.

Weight Deviation (%)

5 cm×5 cm samples were taken at three points arranged in a width direction (that is, a transverse direction, TD) of the electrolytic copper foil, a weight of each of the samples was then measured to calculate a weight per unit area, and a weight deviation was calculated from the weights per unit area of the three samples. That is, the weight deviation may be calculated according to Equation 2 after calculating an "average weight" and a "standard deviation of the weights" from the weights per unit area of the three samples.

$$\text{Weight deviation}(\%) = \frac{\text{Standard deviation of weights}}{\text{Average weight}} \times 100 \qquad \text{Equation 2}$$

Elongation (%)

The elongation of the electrolytic copper foil at room temperature was measured using a UTM according to a method described in the IPC-TM-650 Test Method Manual.

Presence or Absence of Wrinkle

The presence or absence of a wrinkle in the electrolytic copper foil was observed in a process of sequentially manufacturing an anode for a secondary battery and a secondary battery using the electrolytic copper foil.

Breakage of Anode after 500 Cycles of Charging and Discharging

After a charging and discharging test was performed on the secondary battery including the anode manufactured using the electrolytic copper foil 500 times at a temperature of 50° C. and at a charging and discharging speed of 0.5 C, it was observed whether the anode was broken.

TABLE 2

| | Coefficient of Thermal Expansion [μm/(m·°C.)] | Tensile Strength after Heat Treatment (kgf/mm²) | Weight Deviation (%) | Elongation (%) | Presence of Wrinkle | Breakage of Anode after 500 Cycles of Charging and Discharging |
|---|---|---|---|---|---|---|
| Example 1 | 20.9 | 25.6 | 3.8 | 5.6 | X | X |
| Example 2 | 20.3 | 27.2 | 3.6 | 5.3 | X | X |
| Example 3 | 21.8 | 22.1 | 0.7 | 8.9 | X | X |
| Example 4 | 17.3 | 34.5 | 0.6 | 4.8 | X | X |
| Comparative Example 1 | 22.4 | 22.2 | 3.8 | 10.3 | ○ | X |
| Comparative Example 2 | 15.7 | 35.8 | 3.8 | 2.8 | X | ○ |
| Comparative Example 3 | 22.8 | 20.5 | 0.6 | 10.8 | ○ | X |
| Comparative Example 4 | 15.3 | 36.8 | 0.6 | 2.6 | X | ○ |
| Comparative Example 5 | 20.1 | 26.5 | 5.2 | 5.3 | ○ | X |
| Comparative Example 6 | 21.2 | 27.2 | 5.8 | 5.6 | ○ | X |

As illustrated in Table 2, in a case in which a content of TOC in the electrolyte solution was more than 50 ppm when the electroplating was performed (in Comparative Examples 2 and 4), electrolytic copper foils having a coefficient of thermal expansion of less than 16 μm/(m·° C.) and an elongation of less than 3% were manufactured. The charging and discharging test was performed on a secondary battery manufactured by each of the above electrolytic copper foils (Comparative Examples 2 and 4) 500 times, and as a result, breakage of an anode was observed.

Also, in a case in which a concentration of silver (Ag) in the electrolyte solution was more than 25 ppm when the electroplating was performed (in Comparative Examples 1 and 3), electrolytic copper foils having a coefficient of thermal expansion of more than 22 μm/(m·° C.) and an elongation of more than 10% were manufactured. When an electrode and a secondary battery were manufactured by each of the above electrolytic copper foils (Comparative Examples 1 and 3), wrinkles were generated.

Meanwhile, in a case in which a difference between a maximum interval and a minimum interval of the positive electrode plate and the rotating negative electrode drum was more than 0.2 mm (in Comparative Examples 5 and 6), electrolytic copper foils having a weight deviation of more than 5% was manufactured. When an electrode and a secondary battery were manufactured by each of the above electrolytic copper foils (Comparative Examples 5 and 6), wrinkles were generated.

According to the present invention, since curling and/or wrinkling of an electrolytic copper foil during a roll-to-roll process can be prevented, a reduction of productivity due to repeatedly stopping and re-starting a facility can be prevented and manufacturing costs can be reduced. Also, since breakage of the electrolytic copper foil can be prevented when charging and discharging a lithium secondary battery, durability of the secondary battery can be significantly improved.

In addition, according to the present invention, despite repetition of a charging and discharging cycle, a long-life secondary battery capable of maintaining a high charge and discharge capacity for a long time can be manufactured. Therefore, inconvenience of consumers of electronic products and resource waste due to the frequent replacement of secondary batteries can be minimized.

What is claimed is:

1. An electrolytic copper foil, which includes a first surface and a second surface opposite the first surface, the electrolytic copper foil comprising:
   a copper layer including a matte surface facing the first surface and a shiny surface facing the second surface;
   a first protective layer on the matte surface of the copper layer; and
   a second protective layer on the shiny surface of the copper layer,
   wherein:
   a coefficient of thermal expansion of the electrolytic copper foil, which is measured using a thermomechanical analyzer (TMA) while heating the electrolytic copper foil from 30° C. to 190° C. at a speed of 5° C./min, ranges from 16 to 22 μm/(m·° C.),
   a tensile strength of the electrolytic copper foil, which is measured after a heat treatment at a temperature of 190° C. for 1 hour, ranges from 21 to 36 kgf/mm²,
   a weight deviation of the electrolytic copper foil is 5% or less,
   a peak count (Pc) of each of the first and second surfaces of the electrolytic copper foil ranges from 3 to 92, and each of the first and second surfaces has a surface roughness ($R_z$) of 3.5 μm or less.

2. The electrolytic copper foil of claim 1, having an elongation of 3% or more at room temperature.

3. The electrolytic copper foil of claim 1, wherein each of the first and second protective layers includes at least one of chromium (Cr), a silane compound, and a nitrogen compound.

4. The electrolytic copper foil of claim 1, having a thickness of 4 to 30 μm.

5. The electrolytic copper foil of claim 1, having a coefficient of thermal expansion of 17.3 to 22 μm/(m·° C.).

6. A secondary battery electrode comprising:
   an electrolytic copper foil including a first surface and a second surface opposite the first surface; and
   a first active material layer on the first surface of the electrolytic copper foil,
   wherein the electrolytic copper foil comprises:
   a copper layer including a matte surface facing the first surface and a shiny surface facing the second surface;
   a first protective layer on the matte surface of the copper layer; and
   a second protective layer on the shiny surface of the copper layer,
   wherein a coefficient of thermal expansion of the electrolytic foil, which is measured using a TMA while heating the electrolytic copper foil from 30° C. to 190° C. at a speed of 5° C./min, ranges from 16 to 22 μm/(m·° C.),
   wherein a tensile strength of the electrolytic copper foil, which is measured after a heat treatment at a temperature of 190° C. for 1 hour, ranges from 21 to 36 kgf/mm²,
   wherein a weight deviation of the electrolytic copper foil is 5% or less,
   wherein a peak count (Pc) of each of the first and second surfaces of the electrolytic copper foil ranges from 3 to 92, and
   wherein each of the first and second surfaces has a surface roughness ($R_z$) of 3.5 μm or less.

7. The secondary battery electrode of claim 6, wherein the first active material layer includes at least one active material selected from the group consisting of carbon, a metal (Me) such as Si, Ge, Sn, Li, Zn, Mg, Cd, Ce, Ni, or Fe, an alloy containing the metal (Me), an oxide of the metal ($MeO_x$), and a composite of the metal (Me) and carbon.

8. The secondary battery electrode of claim 6, wherein the first active material layer comprises Si.

9. The secondary battery electrode of claim 6, further comprising a second active material layer on the second protective layer.

10. A secondary battery comprising:
    a cathode;
    an anode including a secondary battery electrode;
    an electrolyte configured to provide an environment in which lithium ions may move between the cathode and the anode; and
    a separator configured to electrically insulate the cathode from the anode,
    wherein the secondary battery electrode comprises:
    an electrolytic copper foil including a first surface and a second surface opposite the first surface; and
    a first active material layer on the first surface of the electrolytic copper foil,
    wherein the electrolytic copper foil comprises:
    a copper layer including a matte surface facing the first surface and a shiny surface facing the second surface;
    a first protective layer on the matte surface of the copper layer; and a second protective layer on the shiny surface of the copper layer, wherein a coefficient of thermal expansion of the electrolytic foil, which is measured using a TMA while heating the electrolytic copper foil from 30° C. to 190° C. at a speed of 5° C./min, ranges from 16 to 22 μm/(m·° C.), wherein a tensile strength of the electrolytic copper foil, which is measured after a heat treatment at a temperature of 190° C. for 1 hour, ranges from 21 to 36 kgf/mm$^2$, wherein a weight deviation of the electrolytic copper foil is 5% or less, wherein a peak count (Pc) of each of the first and second surfaces of the electrolytic copper foil ranges from 3 to 92, and wherein each of the first and second surfaces has a surface roughness ($R_z$) of 3.5 μm or less.

* * * * *